US010964057B2

(12) United States Patent
Furihata et al.

(10) Patent No.: US 10,964,057 B2
(45) Date of Patent: Mar. 30, 2021

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventors: Hisayoshi Furihata, Tokyo (JP); Kazuhiko Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 16/112,991

(22) Filed: Aug. 27, 2018

(65) Prior Publication Data

US 2019/0066333 A1 Feb. 28, 2019

(30) Foreign Application Priority Data

Aug. 31, 2017 (JP) .................................. 2017-167662

(51) Int. Cl.
  *G06T 7/77* (2017.01)
  *G06K 9/62* (2006.01)
  *G06K 9/00* (2006.01)

(52) U.S. Cl.
  CPC ............ *G06T 7/77* (2017.01); *G06K 9/00442* (2013.01); *G06K 9/00664* (2013.01); *G06K 9/6254* (2013.01); *G06K 9/6263* (2013.01); *G06K 9/6271* (2013.01)

(58) Field of Classification Search
  CPC .. G06T 7/77; G06K 9/00442; G06K 9/00664; G06K 9/6202; G06K 9/6254; G06K 9/6256; G06K 9/6263; G06K 9/6271
  See application file for complete search history.

(56) References Cited

U.S. PATENT DOCUMENTS

| | | | | |
|---|---|---|---|---|
| 6,298,351 B1* | 10/2001 | Castelli | ................ | G06K 9/0063 |
| 8,935,258 B2* | 1/2015 | Svore | ................... | G06K 9/6257 |
| | | | | 707/748 |
| 9,990,619 B2* | 6/2018 | Miyakoshi | ......... | G06K 9/00624 |
| 10,289,910 B1* | 5/2019 | Chen | .................. | G06K 9/00664 |

(Continued)

FOREIGN PATENT DOCUMENTS

JP 5953151 B2 7/2016

OTHER PUBLICATIONS

Ashapure et al. "Ensemble classifier based training data refinement technique for classification of remotely sensed optical images." 2017 IEEE International Geoscience and Remote Sensing Symposium (IGARSS). IEEE, Jul. 2017. (Year: 2017).*

(Continued)

*Primary Examiner* — Katrina R Fujita

(74) *Attorney, Agent, or Firm* — Rossi, Kimms & McDowell LLP

(57) ABSTRACT

An information processing apparatus comprising: at least one processor programmed to cause the apparatus to: hold label information regarding presence of a target object, the label information being set for the target object in an image; obtain a reliability of the label information; cause a display apparatus to display the label information and an image corresponding to the label information in the image, based on the reliability; accept an operation made by a user; and modify the label information based on the operation.

15 Claims, 7 Drawing Sheets

(56) References Cited

U.S. PATENT DOCUMENTS

| | | | | |
|---|---|---|---|---|
| 2012/0047037 | A1* | 2/2012 | Ueda | G06K 9/00 705/23 |
| 2012/0047039 | A1* | 2/2012 | Sano | G06Q 20/208 705/23 |
| 2014/0126773 | A1* | 5/2014 | Miyakoshi | G06K 9/00 382/103 |
| 2015/0193668 | A1* | 7/2015 | Fukuda | G06Q 20/208 705/23 |
| 2015/0194025 | A1* | 7/2015 | Tsunoda | G07G 1/0036 348/150 |
| 2016/0196543 | A1* | 7/2016 | Miyakoshi | G06K 9/6255 382/103 |
| 2018/0068168 | A1* | 3/2018 | Miyakoshi | G06K 9/6263 |

OTHER PUBLICATIONS

Brodley et al. "Identifying mislabeled training data." Journal of artificial intelligence research 11 (1999): 131-167. (Year: 1999).*

Bruzzone et al. "A novel context-sensitive semisupervised SVM classifier robust to mislabeled training samples." IEEE Transactions on Geoscience and Remote Sensing 47.7 (2009): 2142-2154. (Year: 2009).*

Guan et al. "Identifying mislabeled training data with the aid of unlabeled data." Applied Intelligence 35.3 (2011): 345-358. (Year: 2011).*

* cited by examiner

INFORMATION PROCESSING APPARATUS, METHOD FOR CONTROLLING INFORMATION PROCESSING APPARATUS, AND STORAGE MEDIUM

BACKGROUND OF THE INVENTION

Field of the Invention

The present invention relates to an information processing apparatus, a method for controlling an information processing apparatus, and a storage medium, and relates in particular to a technique for recognizing an object in an image.

Description of the Related Art

A technique of learning patterns from images obtained by photographing objects, and recognizing types and positional orientations of the objects is known. To learn patterns, a person needs to set a label indicating a correct answer value for images. Data of the images and the label is called learning data.

A large quantity of learning data needs to be prepared to create an accurate recognizer. Japanese Patent No. 5953151 describes a method of obtaining learning data with sufficient accuracy ensured, by repeating a "manual labeling operation" and an "operation to evaluate accuracy of a recognizer" until a desired accuracy is achieved.

However, there is a possibility that label information set by a person contains an error. The technique described in Japanese Patent No. 5953151 has a problem in that the accuracy of the recognizer decreases if patterns are learned using learning data that includes incorrect label information.

This invention has been made in view of the foregoing problem, and provides a technique that enables label information set for a target object to be modified, and allows a user to efficiently review learning data.

SUMMARY OF THE INVENTION

According to one aspect of the present invention, there is provided an information processing apparatus comprising: at least one processor programmed to cause the apparatus to: hold label information regarding presence of a target object, the label information being set for the target object in an image; obtain a reliability of the label information; cause a display apparatus to display the label information and an image corresponding to the label information in the image, based on the reliability; accept an operation made by a user; and modify the label information based on the operation.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Summary

This embodiment will describe an example in which a user is allowed to review learning data, considering a possibility that label information in the learning data includes an error.

Figure 1A:
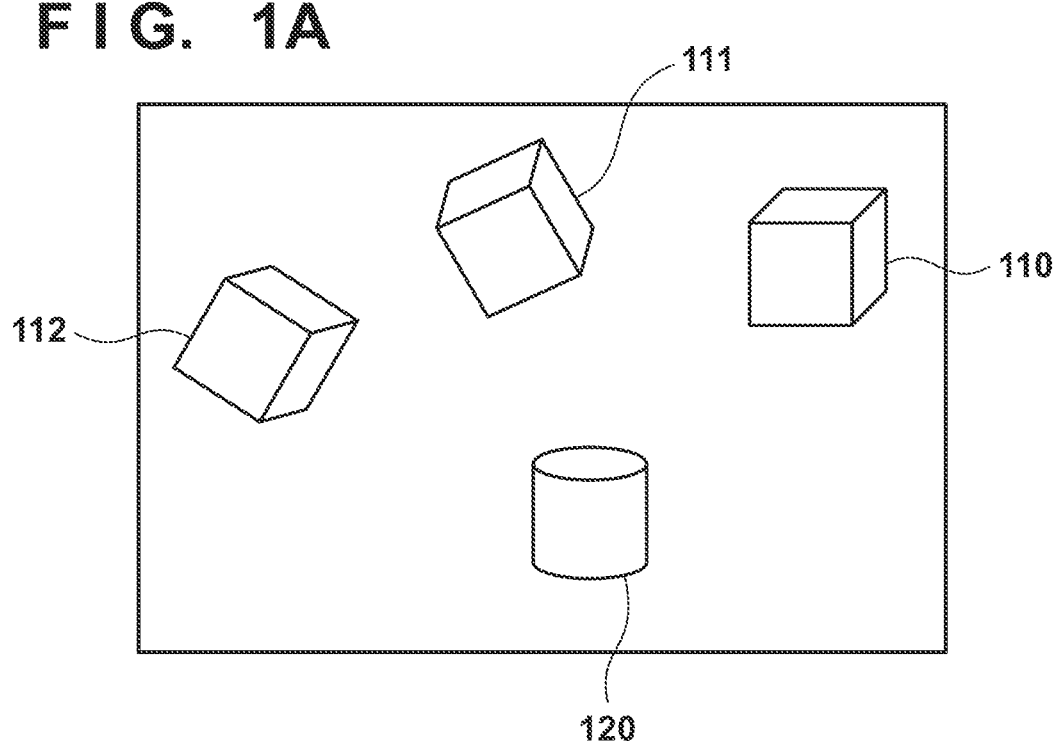
FIGS. 1A and 1B show examples of an image and label information according to a first embodiment.
Figure 1B:
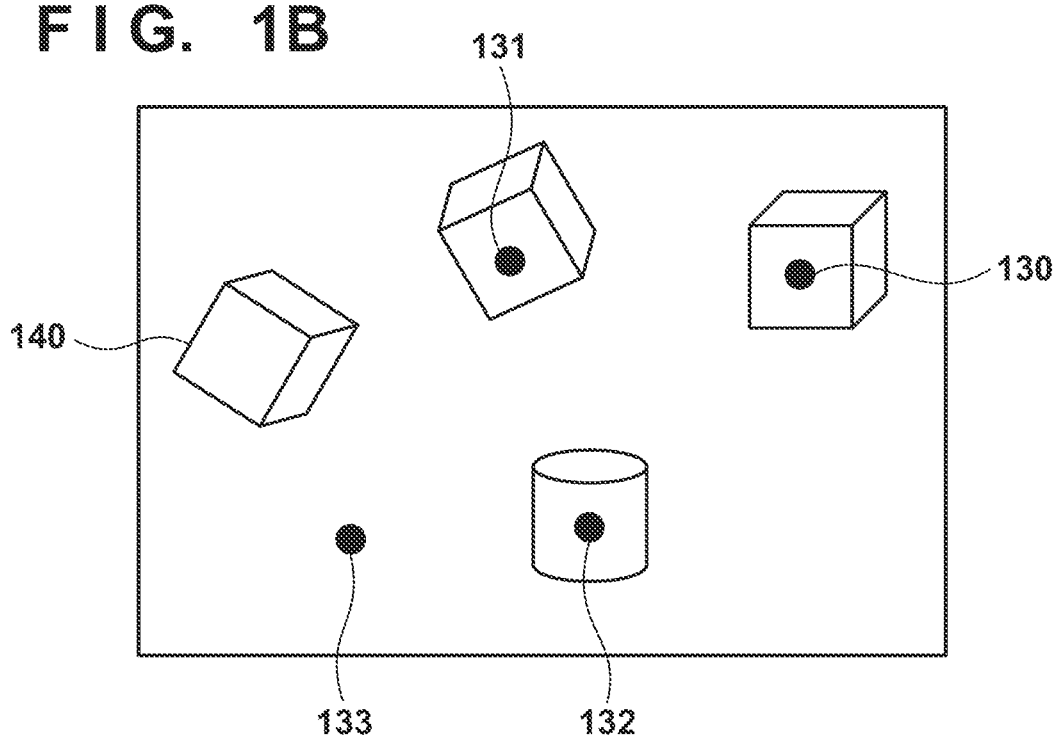

In this embodiment, label information regarding the presence of a target object at an arbitrary position in an image is set. FIG. 1A shows an example of a shot image. In FIG. 1A, rectangular parallelepiped objects denoted by reference numerals 110, 111, and 112 are target objects for which the label information is to be set. Meanwhile, a cylindrical object denoted by reference numeral 120 is a non-target object for which the label information is not to be set. FIG. 1B shows an example in which the user has set the label information. 130 and 131 in FIG. 1B denote examples in which the label information is set at positions where the target objects are present. Here, a position where the label information is set is expressed with a black dot. 132 and 133 denote examples in which the label information is incorrectly set at positions where no target object is present. 140 denotes an example in which the label information is not set although a target object is present.

When the user sets a label, there is a possibility that the label information is incorrectly set, as in the examples in FIG. 1B. In this embodiment, reliability of the label information is calculated, and if the reliability is low (i.e. if the reliability is equal to or less than a predetermined value), the image and label information are selected and displayed. Thus, efficient review of label information is enabled.

System Configuration

Figure 2:
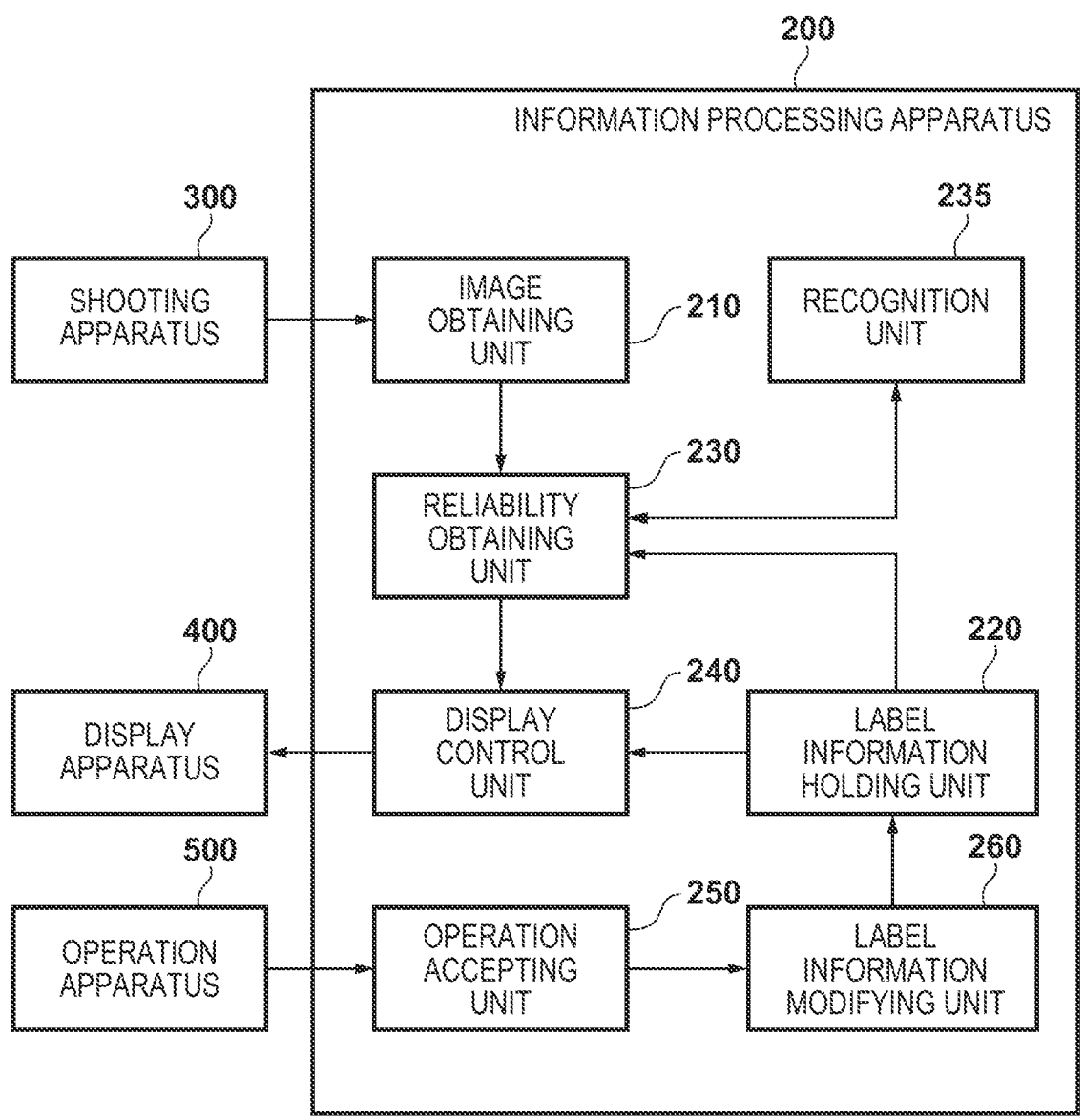
FIG. 2 shows a configuration of an information processing apparatus according to the first embodiment.

First, a system configuration according to this embodiment will be described with reference to FIG. 2. In FIG. 2, 200 denotes an information processing apparatus according to this embodiment, and 300 denotes a shooting apparatus for shooting images. 400 denotes a display apparatus for displaying image information, and 500 denotes an operation apparatus to be operated by the user. The information processing apparatus 200 includes an image obtaining unit 210, a label information holding unit 220, a reliability obtaining unit 230, a display control unit 240, an operation accepting unit 250, and a label information modifying unit 260.

The shooting apparatus 300 is a camera for shooting images. In this embodiment, images are grayscale images, but are not limited thereto. The display apparatus 400 is a monitor for displaying images. In this embodiment, an image obtained by the image obtaining unit 210 and label information held by the label information holding unit 220 are displayed under the control of the display control unit 240. The operation apparatus 500 is a device to be operated by the user. In this embodiment, the operation apparatus 500 is a mouse, but may alternatively be a keyboard or a touch panel.

Apparatus Configuration

Subsequently, constituent elements of the information processing apparatus 200 will be described in detail. The image obtaining unit 210 obtains images shot by the shooting apparatus 300. In this embodiment, the number of images to be obtained is one or more.

The label information holding unit 220 holds label information that is set for each image obtained by the image obtaining unit 210. The label information according to this embodiment is information regarding the presence of a target object at an arbitrary position in an image, and is information regarding whether or not a target object is present at each position in an image. Specifically, information that is 1 is held if a target object is present, and information that is 0 is held if no target object is present. As for the label information, the user sets a label "1" at a position where a target object is present, and a label "0" is set at other positions. A label also holds information regarding position. The position is represented by a two-dimensional coordinate value in an image.

The reliability obtaining unit 230 obtains reliability that indicates the degree of correctness, for each piece of label information held by the label information holding unit 220. Details of a method for calculating the reliability will be described later. A recognition unit 235 recognizes whether or not a target object is present at a designated position in an image, and calculates and outputs the probability that a target object is present. In this embodiment, the probability that a target object is present is calculated using a neural network-based recognizer (which is synonymous with learner, learning model, etc.). The recognizer can output the reliability even in the middle of learning. The reliability can be obtained using a recognizer (learner) that is constructed by, for example, learning image features of a target object using information held by the label information holding unit 220 as training data. Note that a recognizer that recognizes whether or not a target object is present in an image can be constructed by performing learning using images in which target objects are present and images in which no target object is present. The recognition unit 235 may be provided outside the information processing apparatus 200.

The display control unit 240 performs control to display, on the display apparatus 400, an image obtained by the image obtaining unit 210 and the label information held by the label information holding unit 220, based on the reliability calculated by the reliability obtaining unit 230. The operation accepting unit 250 accepts user input that is made using the operation apparatus 500. The label information modifying unit 260 modifies the label information held by the label information holding unit 220, in accordance with a user operation accepted by the operation accepting unit 250.

Processing

Figure 3:
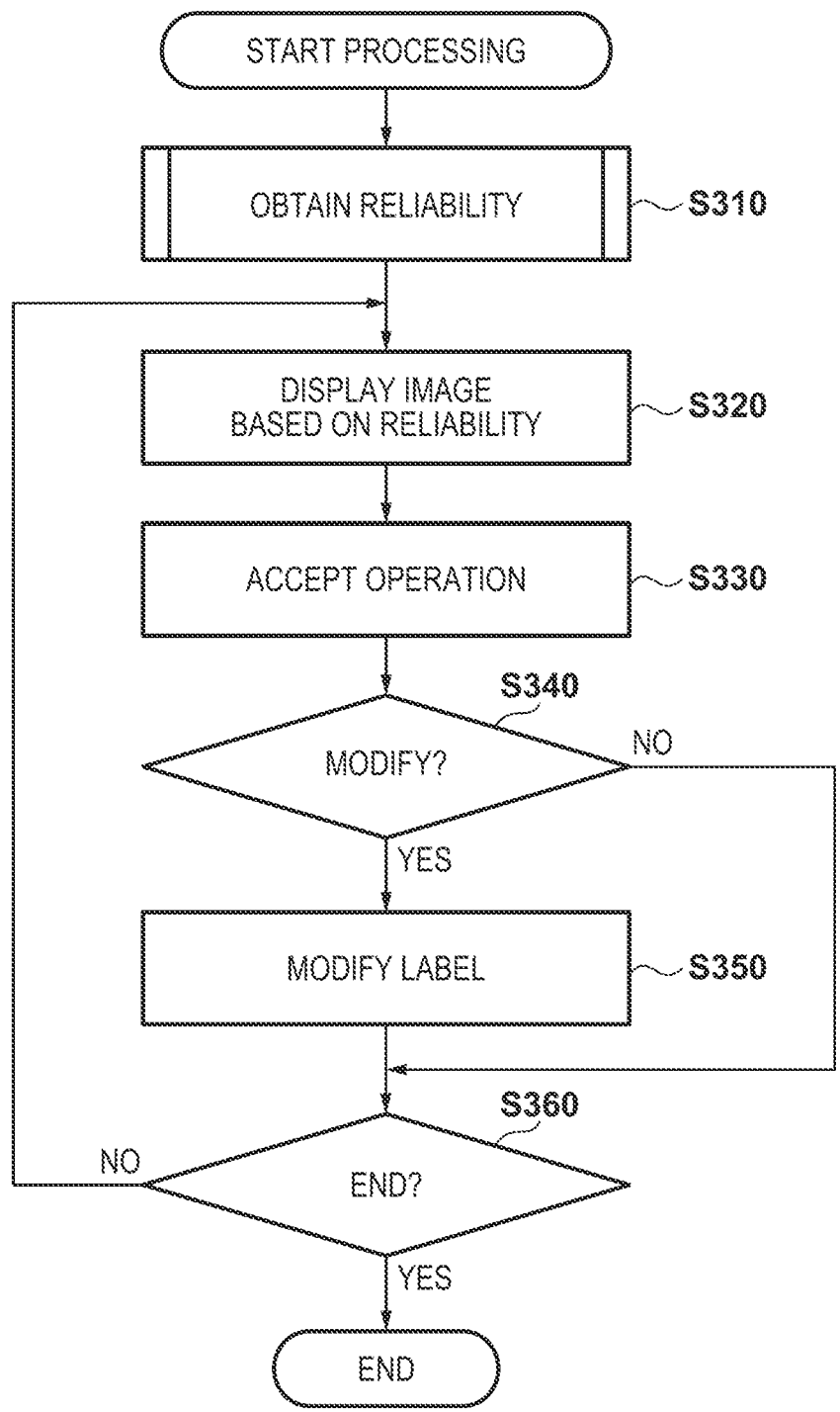
FIG. 3 is a flowchart illustrating processing of the information processing apparatus according to the first embodiment.

Next, processing according to this embodiment will be described. FIG. 3 is a flowchart illustrating a procedure of processing performed by the information processing apparatus 200 according to this embodiment. This processing is for presenting label information that needs to be modified, out of label information that is already set for images by the user, and accepting modification from the user.

(Step S310)

Figure 4:
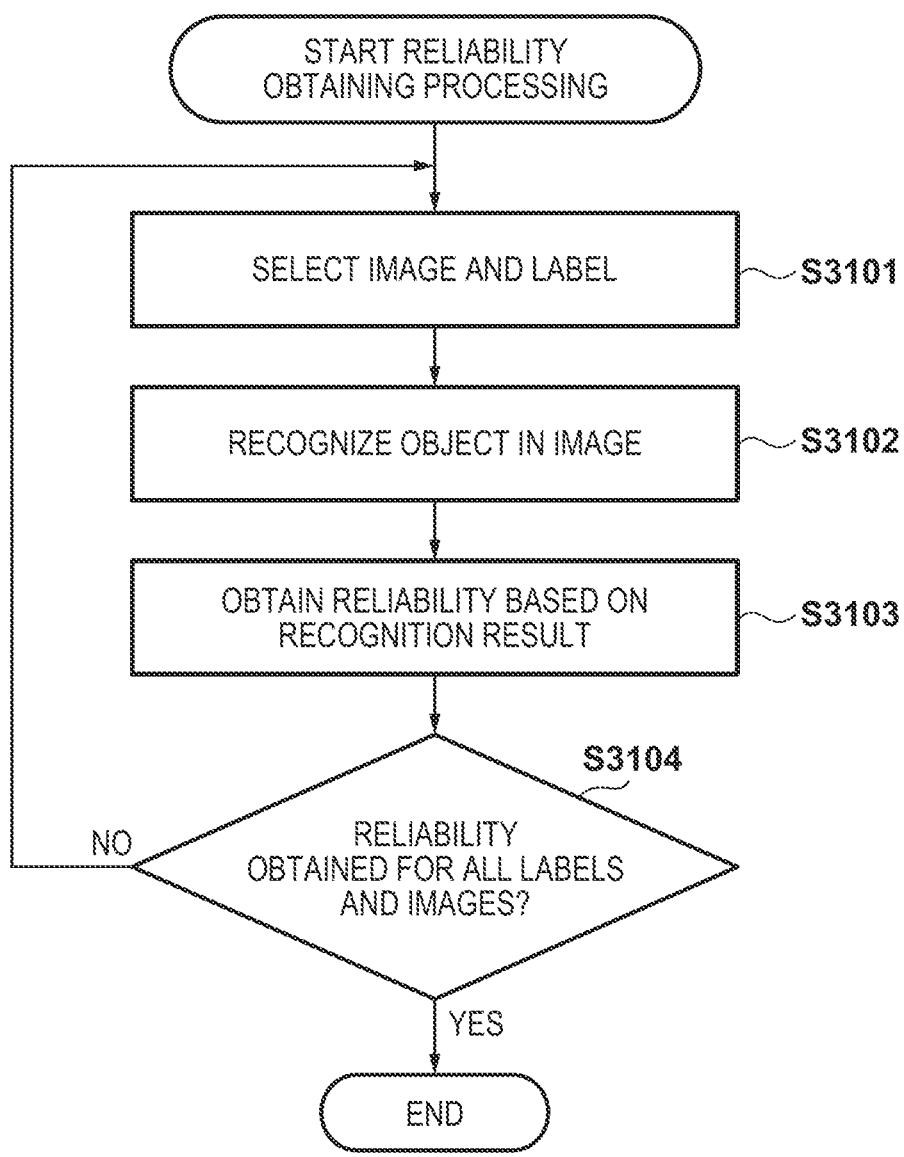
FIG. 4 is a flowchart illustrating processing of a reliability obtaining unit according to the first embodiment.

The reliability obtaining unit 230 obtains reliability, which indicates the degree of correctness, of the label information that is set for an image obtained by the image obtaining unit 210 and is held by the label information holding unit 220. Here, FIG. 4 is a flowchart illustrating a procedure of reliability obtaining processing.

(Step S3101)

Initially, the reliability obtaining unit 230 selects a piece of label information held by the label information holding unit 220. The selected piece of label information will be denoted by L. Also, an image corresponding to this label information is selected from among images obtained by the image obtaining unit 210. The selected image will be denoted by I.

(Step S3102)

Next, the reliability obtaining unit 230 outputs information regarding the image I and the label L to the recognition unit 235, and obtains, from the recognition unit 235, the result of recognizing whether or not a target object is present at a position in the image I indicated by the label L. More specifically, the probability P that a target object is present is calculated by the recognition unit 235, and the result of this calculation is obtained from the recognition unit 235.

(Step S3103)

Regarding the probability P calculated by the recognition unit 235, if the probability P is low although the selected label L is 1, or if the probability P is high although the label L is 0, it is likely that the label information is incorrect. If the label L is 1, the reliability obtaining unit 230 sets the reliability E as E=P. Conversely, if the label L is 0, the reliability obtaining unit 230 sets the reliability E as E=1−P.

(Step S3104)

The reliability obtaining unit 230 determines whether or not the reliability has been obtained for all pieces of label information and images. If the reliability has been obtained for all pieces of label information and images, the processing ends. On the other hand, if the reliability has not been obtained for all pieces of label information and images, the processing returns to step S3101.

Thus, the series of processing is performed for all pieces of label information while changing the piece of label information to be selected. The series of processing in FIG. 4 ends here. Thereafter, the processing proceeds to step S320 in FIG. 3.

(Step S320)

The display control unit 240 causes the display apparatus 400 to display an image obtained and held by the image obtaining unit 210 and the label information held by the label information holding unit 220, based on the reliability obtained by the reliability obtaining unit 230.

The reliability of the label information is low if 1 is set as a label at a position where no target object is present, or if 0 is set as a label at a position where a target object is present. Here, based on this tendency, it is determined that a label of low reliability indicates a high possibility of incorrectness, and this label is displayed together with the image.

First, one piece of label information whose reliability E is equal to or less than a predetermined value is selected from among the label information obtained by the reliability obtaining unit 230. The selected piece of label information will be denoted by L. Next, an area corresponding to the label L in the image is selected. The selected area in the image will be denoted by J. The area J is a rectangular region of a predetermined size with the coordinates of the label L serving as the center, for example.

Figure 5:
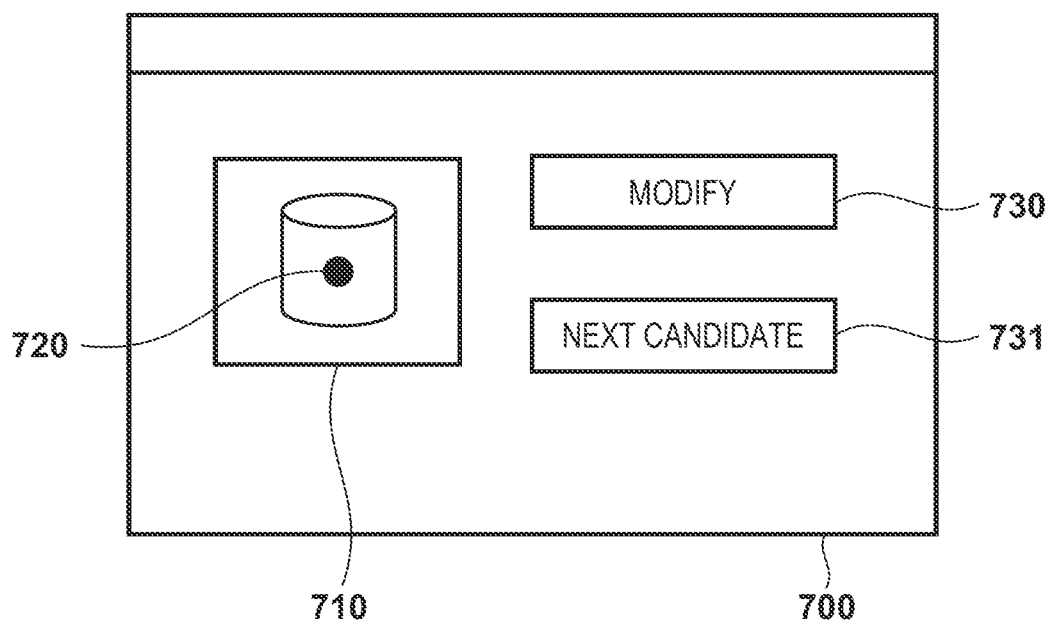
FIG. 5 shows an example in which label information of low reliability and an image are displayed, according to the first embodiment.

Then, a window that includes the area J is displayed on the monitor of the display apparatus 400. FIG. 5 shows a display example. In FIG. 5, 700 denotes the window displayed on the monitor. 710 denotes an example of the displayed area J. The black dot denoted by 720 serves as information indicating that the label is 1. For example, a configuration is employed in which the black dot 720 is displayed if the label is 1, and the black dot 720 is not displayed if the label is 0. Here, a cylindrical object, which is a non-target object, is contained in the area J. Accordingly, the black dot 720 corresponding to the label 1, which indicates that a target object is present, should not be displayed. Thus, the user can determine whether or not the label information is correct by checking the area J displayed on the monitor and whether or not a label is given (i.e. whether or not a black dot is given).

For example, if the label is 1 (i.e. if the black dot 720 is given) although no target object is present in 710 in FIG. 5, it can be determined that the set label information is incorrect. Also, if the label is 0 (i.e. if no black dot is given) although a target object is present, as in the case of 140 in FIG. 1B, it can also be determined that the set label information is incorrect.

(Step S330)

The operation accepting unit 250 accepts user input that is made using the operation apparatus 500. Here, modification of the label information can be accepted through a mouse operation. For example, a button is arranged in a window displayed by the display apparatus 400, and modification of the label information is enabled by clicking the button with the mouse. Here, 730 and 731 in FIG. 5 denote examples of the button. 730 denotes a modify button for executing an operation to modify the label information. 731 denotes a switch button for switching to candidate label information to be displayed next.

(Step S340)

The label information modifying unit 260 determines whether or not to modify the label information, in accordance with the user operation accepted by the operation accepting unit 250. In the example in FIG. 5, the label is 1 although no target object is present. For example, if the modify button 730 is pressed, it is determined that the label information is to be modified. If the switch button 731 is pressed, it is determined that the label information is not to be modified. If the label information is to be modified, the processing proceeds to step S350. On the other hand, if the label information is not to be modified, the processing proceeds to step S360.

(Step S350)

The label information modifying unit 260 modifies the label information held by the label information holding unit 220, in accordance with the user operation accepted by the operation accepting unit 250. For example, the label 1 that was set assuming that a target object was present is corrected to 0, and the label 0 that was set assuming that no target object was present is corrected to 1. With this operation, label information that was set incorrectly can be modified.

(Step S360)

The display control unit 240 determines whether or not to end the processing. If a button (not shown) for ending the series of modifying operation is pressed, or if all modifying operations are complete, the processing ends. On the other hand, if the switch button 731 is pressed, the processing does not end but returns to step S320. The series of processing in FIG. 3 ends here.

As described above, the information processing apparatus according to this embodiment calculates the reliability of label information that is set for a target object, and selects and displays the label information and an image corresponding to the label information based on the reliability, e.g. if the reliability is equal to or less than the predetermined value. Thus, the user who observes the displayed label information and image can modify incorrectly-set label information, and accordingly, the user can efficiently review learning data.

Second Embodiment

Summary

This embodiment will describe an example in which parameters that indicate a position and an orientation are set as the label information regarding the presence of a target object in an image. Note that the orientation in this embodiment refers to a numerical value that indicates an angle in an image.

Figure 6:
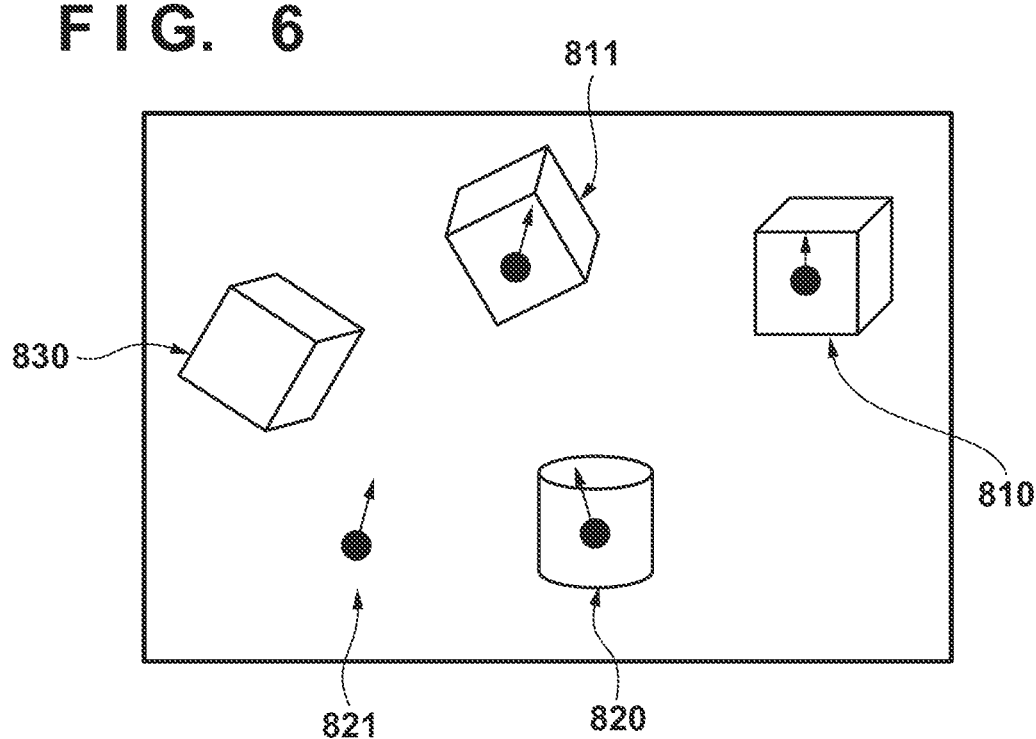
FIG. 6 shows an example of an image and label information according to a second embodiment.

FIG. 6 shows an example in which label information according to this embodiment is set. 810 in FIG. 6 denotes an example in which the label information with a correct orientation is set at a position where a target object is present. The label information expresses the position and orientation of a target object with a black dot and a vector, respectively. Here, the orientation indicates which direction of the image corresponds to a predetermined direction of a target object. In this embodiment, the correct answer is that a vector is set in the direction toward the upper face of a target object. 811 and 820 denote examples in which the positions where target objects are present are correct, but the label information with incorrect orientations is set. 821 denotes an example in which the label information is incorrectly set at a position where no target object is present. 830 denotes an example in which the label information is not set although a target object is present.

In this embodiment, the reliability is calculated for the label information that contains information regarding a position and orientation, and selects and displays an image and the label information based on the reliability. Thus, efficient review of the label information is enabled.

System Configuration and Apparatus Configuration

First, a system configuration according to this embodiment will be described. The system configuration according to this embodiment is the same as that according to the first embodiment. However, the content of processing performed by constituent elements of the apparatuses differs due to the increase in the information contained in the label information.

First, the label information held by the label information holding unit 220 contains information indicating whether or not a target object is present at each position in an image, and information regarding the orientation of the target object. Specifically, the label information contains information that is 1 if a target object is present, and information that is 0 if no target object is present, respectively, and also contains information regarding the position and the orientation. The position is represented by a two-dimensional coordinate value in an image, and the orientation is represented by a numerical value indicating an angle in an image.

The reliability obtaining unit 230 obtains the reliability in the same manner as in the first embodiment, based on the probability P that a target object is present at a designated position in a designated orientation, the probability P being calculated by the recognition unit 235. The recognition unit 235 recognizes whether or not a target object is present at the designated position in the designated orientation in an image. In this embodiment, the probability P that a target object is present at the designated position in the designated orientation is calculated using a neural network-based recognizer. Note that a recognizer that recognizes whether or not a target object is present in an image, and also recognizes the orientation of a target object if present, can be constructed by performing learning using images in which target objects are present and images in which no target object is present, as well as images in which target objects assume different orientations.

Figure 7:
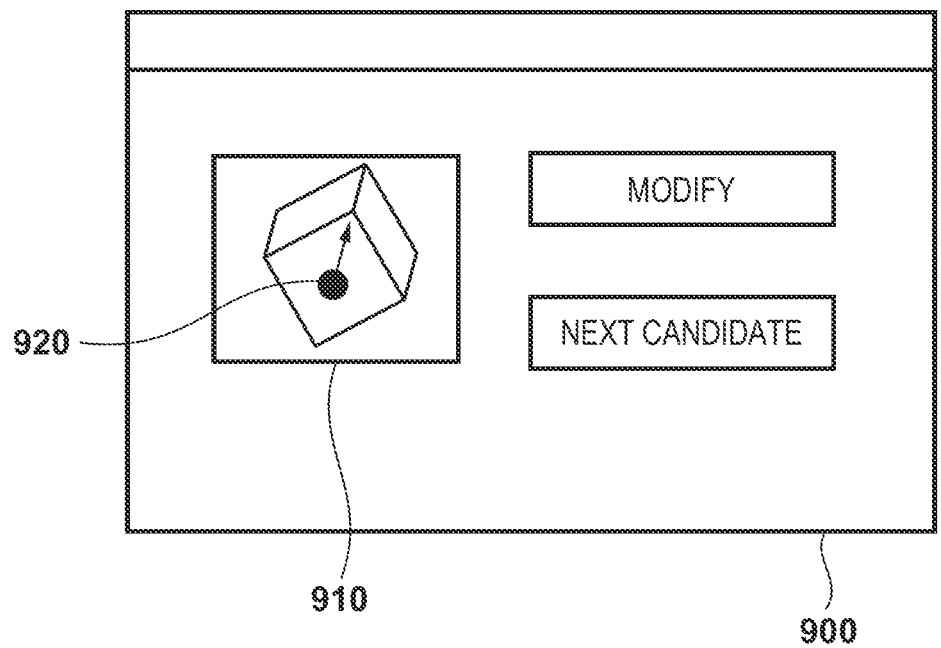
FIG. 7 shows an example in which label information of low reliability and an image are displayed, according to the second embodiment.

The display control unit 240 causes the display apparatus 400 to display an image obtained and held by the image obtaining unit 210 and the label information held by the label information holding unit 220, based on the reliability obtained by the reliability obtaining unit 230. Here, the label information is displayed so that the orientation can be understood. In this embodiment, the orientation is expressed with a vector. FIG. 7 shows a display example. In FIG. 7, 900 denotes a window displayed on the monitor. 910 denotes an example of an area corresponding to the label information in an image. The black dot and vector denoted by 920 indicate information regarding whether or not a target object is present, and information regarding the orientation, respectively.

For example, the vector denoted by 920 in 910 in FIG. 7 is not oriented in the predetermined direction of the target object (here, a direction perpendicular to the upper face of the target object), and accordingly it can be determined that the set label information is incorrect.

The operation accepting unit 250 accepts user input that is made using the operation apparatus 500. For example, a configuration is employed in which, in the case of modifying the orientation, an angle can be input by designating an area in an image using the mouse. Modification to give or not give a label is performed similarly to the first embodiment. The label information modifying unit 260 modifies the label information held by the label information holding unit 220, in accordance with a user operation accepted by the operation accepting unit 250.

As described above, the information processing apparatus according to this embodiment calculates the reliability of the label information that is set for a target object and contains information regarding the position and the orientation, and selects and displays the label information and an image corresponding to the label information based on the reliability, e.g. if the reliability is equal to or less than the predetermined value. Thus, the user who observes the displayed label information and image can modify incorrectly-set label information, and accordingly, the user can efficiently review learning data.

After learning the presence of a target object using the label information held by the label information holding unit 220, when the user newly sets label information as training data, it is conceivable that the reliability of the new label information is obtained. The new label information is employed as training data if the reliability is higher than the predetermined value, and is not employed as training data if the reliability is lower than the predetermined value.

First Modification

In the first and second embodiment, the reliability obtaining unit 230 calculates the reliability that indicates the degree of correctness, for the label information held by the label information holding unit 220, and at this time, the reliability is calculated by the recognition unit 235 based on the result of recognition using a neural network.

However, any other methods for calculating the reliability may be used as long as the degree of correctness of the label information set for an image can be calculated. For example, a method may be employed in which a three-dimensional shape model of a target object is projected onto an image based on the position and orientation indicated by the label information, and the reliability is set based on the degree of coincidence between the projected three-dimensional shape model and the image. Specifically, lines that form a three-dimensional shape model may be projected onto an image, and the reliability may be set based on the degree of coincidence between the projected lines and edges detected in the image.

Alternatively, the degree of coincidence may be calculated by performing template matching on an image using a three-dimensional shape model of a target object as a template, and the reliability may be set based on the degree of coincidence. In this case, high reliability is set if the degree of coincidence is high. Conversely, low reliability is set if the degree of coincidence is low.

A range image may be used to set the reliability based on the quality of the range image. For example, there may be cases where it is difficult to see a target object under a condition that the target object is hidden, or depending on the angle condition of the target object. In this case, it can be estimated that incorrect label information is likely to be set. Then, variations in range information and a tilt of a face may be checked based on the range image, and the reliability may be set based on the values thereof. Specifically, low reliability may be set if the range value significantly varies, or if it is difficult to observe an object since a face of the object is significantly inclined relative to the direction of the line of sight of the shooting apparatus 300.

Alternatively, a method may be employed in which, when the user sets the label information, the user also sets the reliability in accordance with the degree of confidence, and the reliability obtaining unit 230 calculates the reliability of the label information by reading the set reliability.

Second Modification

When displaying an image and the label information, the display control unit 240 described in the first and second embodiments displays the information regarding the position and the orientation contained in the label information, using a black dot and a vector.

Figure 8:
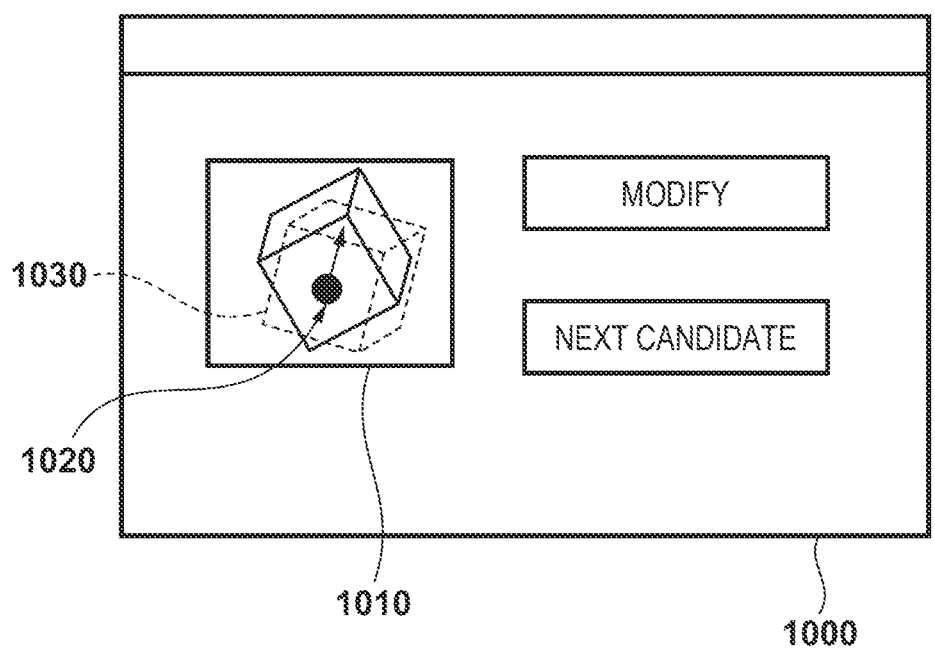
FIG. 8 shows an example in which a model that represents the shape of a target object is displayed, according to a first modification.

However, any other methods for displaying the information contained in the label information may be used as long as the information can be displayed in an understandable manner. For example, a model that represents the shape of a target object may be displayed in an image. FIG. 8 shows an example in which a model is displayed based on the information regarding the position and the orientation contained in a label. In FIG. 8, 1000 denotes a window displayed on the monitor. 1010 denotes an example of an area corresponding to the label information in an image. The black dot and vector denoted by 1020 indicate information indicating that a target object is present, and information regarding the orientation, respectively. Dotted lines 1030 indicate a model that represents the shape of an object, and are displayed in the image based on the information regarding the position and the orientation. The method of displaying a model is advantageous in that whether or not an image and the label information match can be readily checked, compared with the method of simply displaying the position and the orientation with a black dot and a vector. Note that, as for 1010 in FIG. 8, a shift can be found between the image and the model as a result of comparing them, and accordingly it can be determined that the set label information is incorrect. In other methods, the information regarding the position and the orientation may be displayed with characters or numbers. Otherwise, the information regarding the position and the orientation may be displayed with a table or a graph.

Third Modification

The display control unit 240 described in the first and second embodiments cuts out and display one area corresponding to the label information in an image. However, any other methods for displaying an image may be used as long as an area indicated by label information of low reliability calculated by the reliability obtaining unit 230 can be displayed in an understandable manner.

Figure 9A:
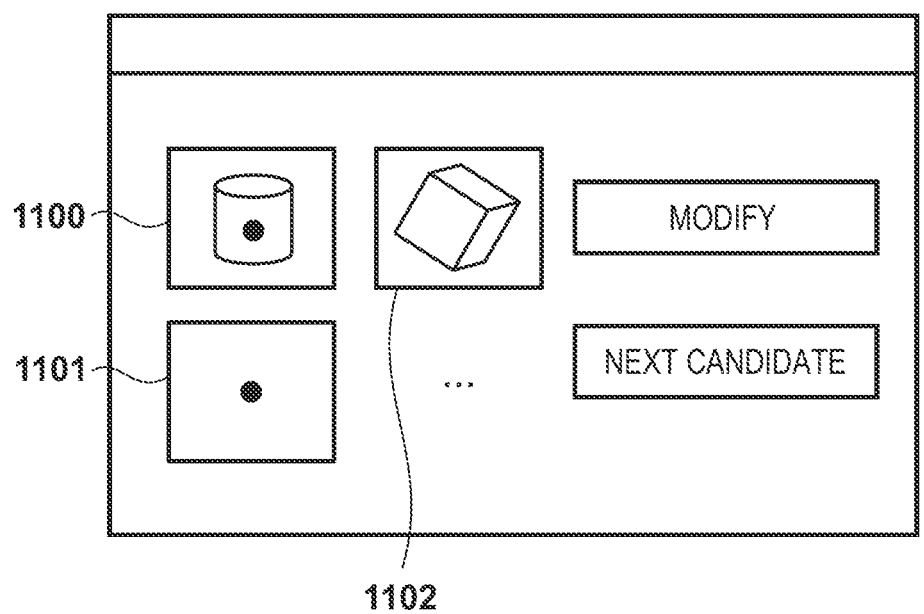
FIGS. 9A and 9B show examples of variations in which label information of low reliability and images are displayed, according to a second modification.

For example, a plurality of images corresponding to a plurality of pieces of label information of low reliability may be displayed collectively. Here, FIG. 9A shows an example in which a plurality of images are displayed collectively. 1100, 1101, and 1102 in FIG. 9A denotes examples of areas indicated by label information of low reliability. In the case of displaying a plurality of images, the images may be displayed in a sorted manner, in accordance with the reliability. That is to say, in this example, a plurality of sets of label information and an area corresponding to the label information in an image are displayed based on the reliability.

Figure 9B:
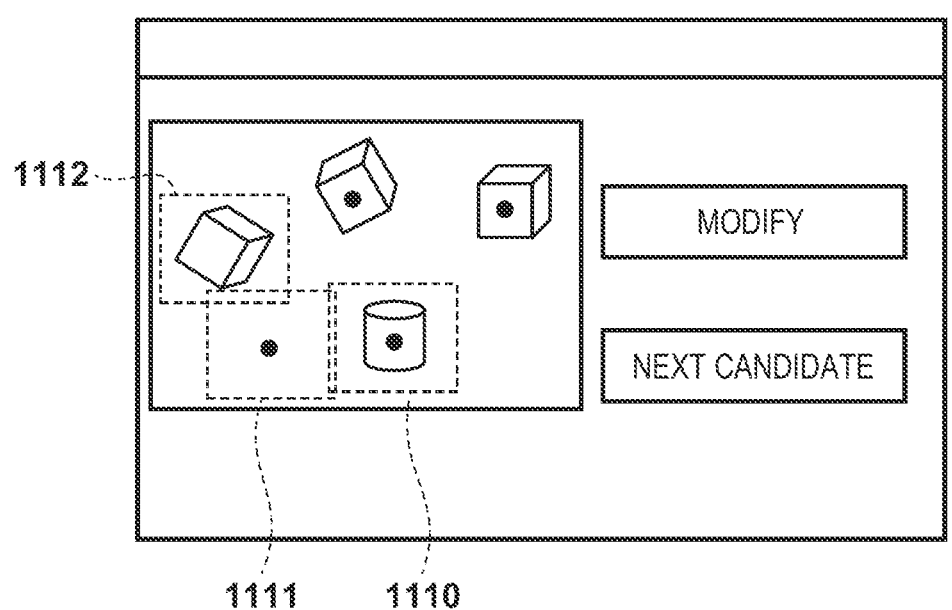

In another method, an entire image may be displayed, and an area indicated by label information of low reliability may be displayed in an emphasized manner. FIG. 9B shows an example in which one entire image is displayed, and areas indicated by label information of low reliability are emphasized by enclosing these areas with frames. Dotted-line frames denoted by 1110, 1111, and 1112 in FIG. 9B indicates the areas indicated by label information of low reliability.

That is to say, in this example, when one image includes a plurality of areas corresponding to label information, the entire image is displayed, and areas corresponding to label information with reliability that is equal to or less than the predetermined value are displayed in an emphasized manner.

Alternatively, a configuration may be employed in which an entire image is displayed, and a distribution of the reliability of areas is displayed as a heat map, so that the label information and the reliability can be compared.

The method of thus displaying a plurality of candidates enables an entire image to be checked at a time, and accordingly can improve the efficiency of the user reviewing the label information.

Fourth Modification

The label information described in the first and second embodiments contains information regarding the position and the orientation of a target object. However, the label information may alternatively be parameters other than the position and the orientation of a target object, and may be, for example, the position and the orientation of a specific portion (portion to be gripped) of a target object.

Specifically, in the case of considering a system in which a robot picks up a target object that is recognized in an image, the position and the angle of the portion of a target object to be gripped are needed. In this case, the position and the angle of the portion of a target object to be gripped may be used as the label information. The content of processing is the same as that according to the first and second embodiments, except that the position and the angle expressed by the label information are different. Also, in this case, the reliability obtaining unit 230 may project a three-dimensional shape model of a target object on an image, and set the reliability based on the degree of coincidence between the projected three-dimensional shape model and the image, as mentioned in the first modification. When the degree of coincidence is calculated, an evaluation value may be calculated while considering a region near the position to be gripped as important.

Furthermore, information indicating the color and the type of a target object may also be added to the label information. In this case, due to the increased amount of information, the recognition unit 235 also recognizes the color and the type of a target object, and then outputs the probability. The reliability obtaining unit 230 calculates the reliability in accordance with a difference between the probability output by the recognition unit 235 and the set label information.

Fifth Modification

In the first and second embodiments, images obtained by the image obtaining unit 210 are grayscale images. However, the images to be obtained may be either grayscale images or color images as long as the images are obtained by photographing a target object. The images to be obtained may alternatively be range images that contain information regarding the distance to a target object. Furthermore, the method for obtaining images may be any method that enables images shot by the shooting apparatus 300 to be obtained. Images may be obtained via a network, or images that are temporarily saved into a memory may be obtained.

The shooting apparatus 300 may be any kind of apparatus that obtains images. The shooting apparatus 300 may be a camera that obtains two-dimensional image information, or may be a range sensor that obtains range images.

Sixth Modification

Each piece of the label information described in the first and second embodiments is indicated by one dot in FIG. 1B. The method of giving the label information is not limited to giving the label information as a dot, and the label information may alternatively be given as a region.

Effects

In the first embodiment, the reliability of the label information is calculated, and if the reliability is equal to or less than the predetermined value, the image and label information are selected and displayed. Thus, the label information can be reviewed efficiently.

In the second embodiment, the reliability is calculated for the label information that contains information regarding the position and the orientation, and selects and displays an image and the label information based on the reliability. Thus, the label information can be reviewed efficiently.

Definition

In the present invention, the label information held by the label information holding unit 220 may be information that represents the position and the orientation of a target object, or may be information that represents the position and the angle of a specific portion that is set on a target object, such as a position to be gripped. Furthermore, information regarding the color and the type of an object may also be added.

In the present invention, the reliability obtained by the reliability obtaining unit 230 may be obtained using any method as long as the reliability that represents the degree of correctness of the label information can be calculated. The reliability may be calculated in accordance with the result of neural network-based recognition, or the reliability may be calculated by using a three-dimensional shape model of a target object as a reference and checking the degree of coincidence between the three-dimensional shape model and an image. The reliability may be calculated using range information regarding a range image, based on the tilt and variations of the range information. Also, when the user sets the label information, the user may set the reliability in accordance with the degree of confidence, and the reliability may be obtained by reading out the set reliability.

In the present invention, information displayed by the display control unit 240 may be displayed using any method as long as an area indicated by label information whose reliability obtained by the reliability obtaining unit 230 is equal to or less than the predetermined value can be displayed in an understandable manner. An area corresponding to label information of low reliability in an image may be cut out and displayed, or otherwise, an entire image may be displayed, and an area corresponding to label information of low reliability may be indicated by a rectangular frame or the like.

According to the present invention, the label information that is set for a target object can be modified, and the user can efficiently review learning data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-167662, filed Aug. 31, 2017, which is hereby incorporated by reference wherein in its entirety.

What is claimed is:

1. An information processing apparatus comprising:
one or more processors programmed to cause the apparatus to function as:
a first obtaining unit configured to obtain label information that is used as learning data of a learned model that recognizes a presence of a target object in an input image, given by a user, relating to a position where the target object is present in an image obtained by capturing the target object, wherein the label information is added to the image obtained by capturing the target object;
a second obtaining unit configured to obtain a reliability representing a degree of certainty that the label information obtained by the first obtaining unit is added at a position corresponding to the position where the target object is present in the image obtained by capturing the target object, based on a recognition result obtained by inputting the image into the learned model trained using a neural network;
a display control unit configured to cause a display apparatus to, in a case where the reliability is lower than a predetermined value, display the position indicated by the label information in the image obtained by capturing the target object and the reliability; and
a determining unit configured to determine whether to modify the position indicated by the label information based on a user operation input to the image for the label information whose reliability is lower than the predetermined value.

2. The information processing apparatus according to claim 1,
wherein the second obtaining unit obtains the reliability based on a probability that the target object is present at the position indicated by the label information, the probability output as a recognition result obtained by inputting the image obtained by capturing the target object into the learned model.

3. The information processing apparatus according to claim 1,
wherein the label information contains information indicating whether or not the target object is present at an arbitrary position in the image obtained by capturing the target object.

4. The information processing apparatus according to claim 1,
wherein the label information contains information indicating whether or not the target object is present at an arbitrary position in the image obtained by capturing the target object, and information regarding an orientation of the target object at the position.

5. The information processing apparatus according to claim 4,
wherein, when the display control unit causes the display apparatus to display the position indicated by the label information in the image obtained by capturing the target object, a model representing a shape of the target object is displayed in the image obtained by capturing the target object, based on the information regarding the position and the orientation contained in the label information.

6. The information processing apparatus according to claim 1,
wherein the label information is information regarding a portion of the target object, the portion to be gripped.

7. The information processing apparatus according to claim 1,
wherein, when the display control unit causes the display apparatus to display the position indicated by the label information in the image obtained by capturing the target object, a plurality of positions indicated by sets of the label information is displayed based on the reliability.

8. The information processing apparatus according to claim 1,
wherein, when the display control unit causes the display apparatus to display the position indicated by the label information in the image obtained by capturing the target object, if a plurality of images corresponding to the label information are included in one image, the one image is displayed entirely, and an image corresponding to label information with the reliability that is equal to or less than the predetermined value is displayed in an emphasized manner.

9. An information processing apparatus comprising:
one or more processors programmed to cause the apparatus to function as:
a learning model obtaining unit configured to obtain the learned model that is based on a neural network that has learned an image feature of a target object, using as learning data a plurality of pieces of label information relating to a position where the target object is present, using at least one image obtained by photographing the target object
a reliability obtaining unit configured to obtain a reliability representing a degree of certainty that the label information corresponding to a presence of the target object in the at least one image is added at a position corresponding to the position where the target object is present in the at least one image, based on a recognition result obtained by inputting the at least one image to which the label information is added into the learned model that is based on the neural network;
a display control unit configured to cause a display apparatus to, in a case where the reliability is lower than a predetermined value, display the position indicated by the label information and the position where the target object is present in the at least one image; and
a determination unit configured to determine whether to modify the position indicated by the label information to correspond to the position where the target object is present in the at least one image displayed on the display apparatus.

10. The information processing apparatus according to claim 9,
wherein, when the reliability obtaining unit obtains the reliability, the learned model is caused to output a probability that the target object is present at the position to which the label information is given, and the reliability is obtained using the probability.

11. The information processing apparatus according to claim 9,
wherein, when the display control unit causes the display apparatus to display the position indicated by the label information in the at least one image, a plurality of positions indicated by sets of the label information is displayed based on the reliability.

12. The information processing apparatus according to claim 9,
wherein, when the display control unit causes the display apparatus to display the position indicated by the label information in the at least one image, if a plurality of images corresponding to the label information are included in one image, the one image is displayed entirely, and an image corresponding to label information with the reliability that is equal to or less than the predetermined value is displayed in an emphasized manner.

13. A method for controlling an information processing apparatus the method comprising:
obtaining label information that is used as learning data of a learned model that recognizes a presence of a target object in an input image, given by a user, relating to a position where the target object is present in an image obtained by capturing the target object, wherein the label information is added to the image obtained by capturing the target object;
obtaining a reliability representing a degree of certainty that the label information obtained by the first obtaining unit is added at a position corresponding to the position where the target object is present in the image obtained by capturing the target object, based on a recognition result obtained by inputting the image into the learned model trained using a neural network;
causing a display apparatus to, in a case where the reliability is lower than a predetermined value, display the position indicated by the label information in the image obtained by capturing the target object and the reliability; and
determining whether to modify the position indicated by the label information based on a user operation input to the image for the label information whose reliability is lower than the predetermined value.

14. A method for controlling an information processing apparatus, the method comprising:
obtaining the learned model that is based on a neural network that has learned an image feature of a target object, using as learning data a plurality of pieces of label information relating to a position where the target object is present, using at least one image obtained by photographing the target object;
obtaining a reliability representing a degree of certainty that the label information corresponding to a presence of the target object in the at least one image is added at a position corresponding to the position where the target object is present in the at least one image, based on a recognition result obtained by inputting the at least one image to which the label information is added into the learned model that is based on the neural network;
causing a display apparatus to, in a case where the reliability is lower than a predetermined value, display the position indicated by the label information and the position where the target object is present in the at least one image; and
determining whether to modify the position indicated by the label information to correspond to the position where the target object is present in the at least one image displayed on the display apparatus.

15. A non-transitory computer-readable storage medium storing a computer program for causing a computer to perform a method for controlling an information processing apparatus, the method comprising:
obtaining label information that is used as learning data of a learned model that recognizes a presence of a target object in an input image, given by a user, relating to a position where the target object is present in an image obtained by capturing the target object, wherein the label information is added to the image obtained by capturing the target object;
obtaining a reliability representing a degree of certainty that the label information obtained by the first obtaining unit is added at a position corresponding to the position where the target object is present in the image obtained by capturing the target object, based on a recognition result obtained by inputting the image into the learned model trained using a neural network;

causing a display apparatus to, in a case where the reliability is lower than a predetermined value, display the position indicated by the label information in the image obtained by capturing the target object and the reliability; and determining whether to modify the position indicated by the label information based on a user operation input to the image for the label information whose reliability is lower than the predetermined value.

\* \* \* \* \*